René Jaume, INVENTOR.

Bierman & Bierman, ATTORNEYS.

3,516,542
STACKED, IDENTICAL FILTER ELEMENTS
René Jaume, 36 Rue Erlanger, Paris, France
Filed Aug. 19, 1968, Ser. No. 753,410
Claims priority, application France, Aug. 24, 1967,
118,818/67
Int. Cl. B01d 25/04
U.S. Cl. 210—168                                                6 Claims

ABSTRACT OF THE DISCLOSURE

A stack of identical filtering elements, each element having a sealing bead thereon, adjacent elements having beads disposed in different relative positions.

---

The present invention relates to disc-shaped filter elements adapted to be stacked to constitute a filtration unit adapted to be mounted in a crankcase or the like and act as a filter cartridge or refill.

Filter elements of this type comprise a central hole adapted to form an axial passage through the filtration unit, the fluid to be filtered flowing into this unit from the outer periphery and being delivered through this axial passage, or vice versa.

These filter elements are advantageous in that they permit obtaining a filter surface of relatively great area while maintaining the volume of the unit within particularly reduced limits.

However, in order to ensure a satisfactory filtering action the fluid to be filtered must be directed along a suitable path so that it flows through at least one of the filter-forming walls before reaching the space from which the filtered fluid is collected.

To this end, in certain known prior art filter designs wherein the passages provided for permitting the fluid two different types of filter elements are provided, wherein the passages provided for permitting the fluid flow are arranged in different manners. When assembling these filter elements to constitute a filter unit or cartridge, the stacking must therefore comprise alternately a filter element of the first type and a filter element of the second type, and so forth. As will be readily understood, this constitutes a major inconveniece and a source of error and complications, not only when assembling the filter elements but also during the manufacture and storage thereof.

Therefore, the present invention is directed to provide new filter elements of the general type set forth hereinabove, which are so designed that they are of only one type and can nevertheless cause the compulsory flow of the fluid to be filtered through at least one filter-forming wall of one of these elements.

To this end, these filter elements are characterized in that their main surface is subdivided by a seal-forming bead projecting from one face into two separate zones, the first zone being provided with an inner sealing rim preventing the fluid from flowing into the central axial passage of the corresponding element, the second zone having on the contrary an outer peripheral sealing rim preventing the fluid flow towards the outer periphery of the element.

Filter elements of this type are adapted to be stacked on each other with a certain angular shift so that the first zone of a given element registers with the second zone of the two adjacent elements disposed on either side of said given element.

Under these conditions, although all the filter elements are strictly identical with one another, the fluid to be filtered must compulsorily flow through at least one filter-forming wall of one of these elements.

The filter element consituting the subject-matter of this invention can be embodied in many different ways, some of which will now be described by way of example with reference to the accompanying drawing, in which.

Figure 1:
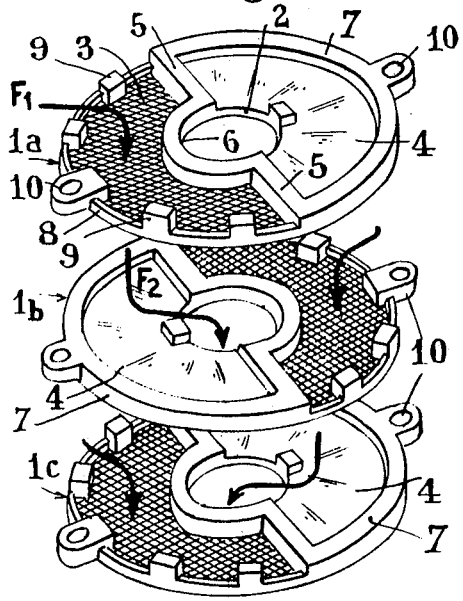
FIG. 1 is a perspective view showing a plurality of filter elements according to this invention, disposed at spaced intervals above each other in order to afford a clearer understanding of the mode of operation of filter unit consisting of stacked elements of this type.

In the example illustrated in FIG. 1 each filter element has substantially the shape of a circular disc, as exemplified at 1a, 1b and 1c formed with a central aperture 2. However, all these elements are strictly identical.

Each filter element is subdivided into two different zones 3 and 4 by a fluid-tight sealing bead 5 projecting from one of the main faces of each element. This sealing bead 5 is disposed diametrally in that it comprises two radial portions disposed on either side of the central aperture 2.

In the example illustrated in FIG. 1 the first zone 3 of each filter element consists of a filtering wall and the second zone 4 is solid or impervious. The filtering wall constituting the first zone may advantageously consists of filter gauze, for example metal gauze, or more advantageously of synthetic or natural woven or pressed textile yarns. However, this wall may also consist of treated or untreated paper, and generally of any suitable filtering material. As to the solid or impervious zone 4, it consists of a plastic part moulded directly on the filtering wall constituting the first zone 3, so as to seal same.

Besides, the first zone 3 comprises an inner sealing bead or rim 3 surrounding the central aperture 2. The ends of this rim are connected to the two radial portions of the diametral bead 5. As to the second zone 4, it comprises on the one hand an external sealing rim 7 of which the ends are connected to the two radial sections of the diametral bead 5.

Formed on the outer periphery of the first zone 3 is a stiffening rim 8 carrying a plurality of studs 9 projecting from the same face as the sealing bead 5 and thicker rims 6 and 7; the function of these studs 9 consists in properly spacing and/or positioning the filter elements when they are stacked to constitute a filter unit.

The various auxiliary members thus provided on each filter element are preferably of plastic material moulded directly on the filtering wall constituting the first zone 3 of an element. Of course, these auxiliary members are moulded jointly with the solid wall constituting the second zone 4 of each element, i.e. by means of a same and single operation. The plastic material used to this end is selected to have a certain elasticity or at least a certain compressibility. This material may consist for example of polyamid resin, or an elastomer, or any other suitable material, including metals.

Of course, in case the filtering wall constituting the first zone 3 consisted of synthetic material, it is advantageous to use a resin of same nature for making the solid wall 4 as well as the above-mentioned auxiliary members carried by each filter element. In any case, the auxiliary members thus formed by direct moulding on the filtering wall 3 become an integral part thereof, and the sealing bead 5 as well as the outer peripheral sealing rims 6 and 7 constitute fluid-tight barriers preventing the passage of the fluid to be filtered.

Figure 4:
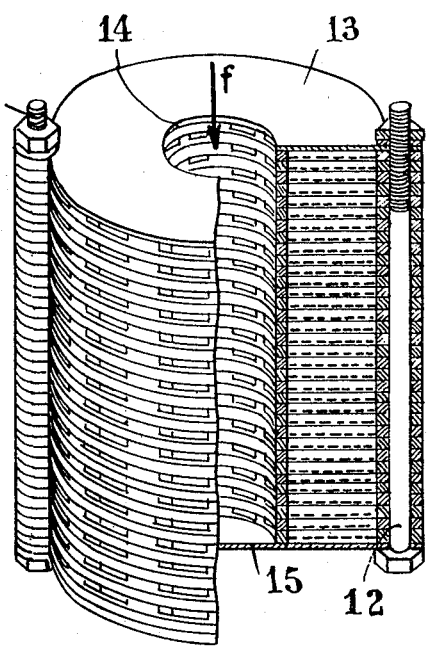
FIG. 4 is a perspective view, with parts broken away, showing a filter unit consisting of stacked filter elements according to the present invention.

The elements thus formed are adapted to be assembled by stacking them as shown in FIG. 4, each element being shifted angularly by 180° with respect to the adjacent elements, so that these elements have the same relative positions as the three elements illustrated in FIG. 1.

Thus, the solid zone 4 of the intermediate element 1b of this figure registers with two filtering zones 3 of the adjacent elements 1a and 1c disposed on either side of this element.

The various elements thus assembled are clamped against one another in order to constitute a rigid filter unit adapted to be mounted for example in a crankcase for constituting a filter cartridge. The bead 5 separating the two zones 3 and 4 of each element as well as the rims 6 and 7 and the studs 9 maintain a certain relative spacing between two adjacent elements, thus forming two separate compartments between two adjacent filter elements.

Under these conditions, it is clear that if the fluid to be filtered penetrates into the outer periphery of the filtration unit and flows therefrom through the axial passage constituted by said central aperture 2 of the various elements, this fluid will penetrate, between two adjacent filter elements, into the corresponding compartment free of any external or peripheral thick sealing rim 7. Thus, this fluid is caused to flow through the filter zone 3 of the element, for example of element 1a. In fact, the sealing rim 6 surrounding the inner edge of this filtering zone prevents the fluid from flowing directly into the axial passage of the filter unit.

Thus, the fluid will flow through the filtering zone 3 in the direction of the arrow $F_1$ so as to register with the solid portion 4 of the next element 1b. Since the outer thick rim 7 of this zone prevents the fluid from escaping from the outer periphery of the element the filtered fluid is compelled to flow through the axial passage of the filter unit as shown by the arrow $F_2$.

The same process is repeated at the various zones of the different successive elements of the filter unit. Thus, each fraction of the fluid to be filtered is compulsorily caused to flow through a filtering wall before being allowed to flow into the axial passage of the filter unit from which the filtered fluid is collected.

Figure 2:
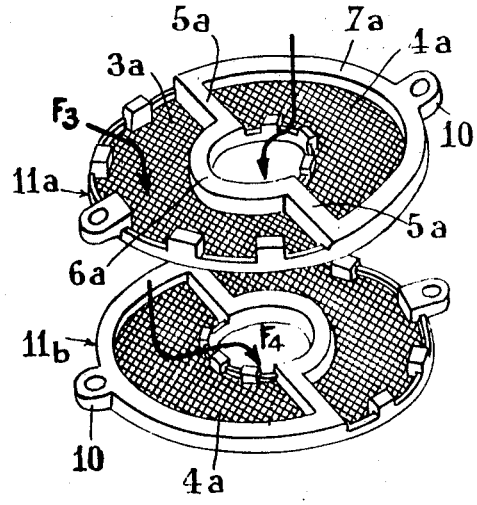
FIGS. 2 and 3 are similar perspective views showing other possible forms of embodiment of the filter elements of this invention.

FIG. 2 illustrates another form of embodiment of the filter elements according to this invention. In this alternate form of embodiment the whole of the surface area of each element 11a or 11b consists of a filtering wall. However, as in the preceding case, these elements are all identical.

Their surface is also divided into two zones 3a and 4a by a diametral bead 5a.

On the other hand, each filter element comprises the same auxiliary members as in the first form of embodiment illustrated in FIG. 1, notably an inner semi-circular rim 6a for the first zone 3a and an outer semi-circular rim 7b for the other zone 4a.

Of course, these elements are adapted to be stacked on each other, with a mutual 180-degree angular shift between each pair of successive or adjacent elements.

Under these conditions, if the fluid to be filtered penetrates into the filter unit through the outer peripheral inlets thereof, it is caused to flow firstly through a first filtering zone 3a of a given element, for example element 11a, along the path shown by the arrow $F_3$. Having thus passed through this zone 3a of the element, the fluid registers with the second zone 4a of the next element 11b, and can thus flow out through the axial passage of the filter unit, as shown by the arrow $F_4$, since this zone 4a has no inner sealing rim.

Figure 3:
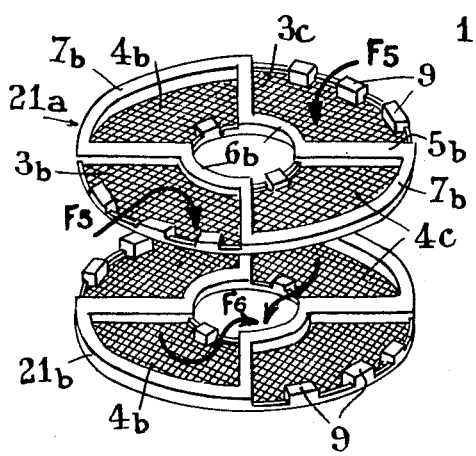

FIG. 3 illustrates a further form of embodiment of the filter units according to this invention wherein the entire surface area of each element consists of a filtering wall. However, the arrangement of two separate zones provided on each element differs, each zone being somewhat subdivided in turn into two portions or sectors.

Thus, the surface area of each element 21a, 21b of FIG. 3 is subdivided into four separate zones denoted 3b, 3c on the one hand and 4b, 4c on the other hand.

The first two zones of each element 21a, 21b comprise an inner part-circular sealing rim 6b, and the other two zones are formed with an external part-circular sealing rim 7b. These various zones are limited by a continuous sealing bead 5b connected to the aforesaid inner and outer sealing rims 6b and 7b.

Of course, these sealing rims as well as a plurality of spacer studs 9 consist of plastic material moulded directly on each filter element of the filter unit.

These filter elements are assembled by mutually shifting through 90 degrees the elements of each pair of adjacent elements. Under these conditions if the fluid to be filtered penetrates into the filter unit at the outer periphery thereof, it is caused to flow through the two zones 3b and 3c of each element along the path shown by the arrow $F_5$.

Thus, the fluid registers with the zones 4b and 4c of the next element, so that it can flow into the central passage of the filter unit.

Thus, in all the various forms of embodiment described and illustrated herein the filter elements according to this invention are advantageous in that they are all identical and nevertheless the fluid to be filtered is compelled to flow through at least one filtering wall before it flows into the central or axial passage where it is collected in the filtered state. This constitutes an essential feature of the filter elements of this invention. Another important advantageous feature of these elements is that the final cost of a filter unit consisting of stacked filter elements of this type is particularly low due to the fact that the use of any intermediate or insert pieces is definitely precluded.

However, the arrangement and distribution of the various zones provided in each filter element may be further varied without departing from the basic principle of the invention. Therefore, the specific forms of embodiment described hereinabove with reference to the accompanying drawing should not be construed as limiting the invention since various other modifications and variations may be brought thereto without departing from the spirit and scope of the invention as set forth in the appended claims.

Thus, the member moulded on each filtering wall may consist of cast or extruded metal, in lieu of plastic material. However, in this case (i.e. when using metal filter elements) some kind of gaskets must be provided between the filter elements, these gaskets being either cemented to, or separate from, the elements.

The filter elements according to this invention may also be manufactured by moulding beforehand a plastic frame structure or reinforcement constituting the members to be applied to each filtering wall, and subsequently sealing or welding this reinforcement to a filtering wall consisting of synthetic resin, by using an induction of high-frequency or ultrasonic welding process.

However, it would also be possible to make each filter element according to this invention by disposing a filtering wall between two reinforcement or frame structures manufactured separately and comprising the aforesaid auxiliary members to be added to said filtering wall, these reinforcements or frame structures being assembled with the filtering wall through any suitable method.

Besides, it may be emphasized that although in the above described examples the fluid to be filtered is repeatedly referred to as penetrating into the filter element from the outer periphery thereof and flowing out through the central or axial passage, the fluid flow may also take place in the opposite direction, i.e., by introducing the fluid to be filtered into said axial passage and recovering the filtered fluid from the peripheral openings of the filter unit.

Thus, FIG. 4 illustrates by way of example a filter unit designed for feeding the fluid to be filtered into the central or axial passage.

This unit comprises a number of filter elements of the type illustrated in FIG. 2, which are stacked and clamped against each other by bolts 12 extending through perforated aligned lugs 10 moulded integrally with the filter elements. However, any other adequate assembly method may be resorted to, for example one using tie-rods provided with hook means, or snap-action fasteners or knobs, or any other suitable and similar assembling members provided on each filter element.

One end of the filter unit thus obtained is provided with a flange 13 formed with a central hole 14, and the opposite end of the filter unit is sealed by a solid flange or disc 15.

This filter unit is adapted to be mounted in the crankcase of an automobile engine or the like, and in this application the inlet pipe for the fluid to be filtered opens into the central hole 14 of flange 13 so that the fluid penetrates through the axial passage of this filter unit as shown by the arrow f. The filtered fluid can thus be collected from the inner space of the crankcase. Of course, this path may be reversed, if desired, as already explained hereinabove.

Finally, this invention is also concerned with filter units made by assembling filter elements of the types described hereinabove as well as filter structures equipped with such filter units.

What I claim is:

1. Filter elements having substantially the shape of discs formed with a central aperture and adapted to be stacked coaxially on one another to constitute a filter unit in which the fluid to be filtered is introduced into the outer periphery and recovered in the filtered condition from the axial passage formed by said central aligned apertures, or vice versa, said filter elements being all identical and characterized in that their surface area is subdivided into two separate zones by a sealing bead formed on one of the main faces of each element, the first zone carrying an inner part-circular sealing rim preventing the flow of said fluid towards the axial passage of the corresponding element, and the second zone comprises on the other hand an outer part-circular sealing rim preventing the passage of fluid towards the outer periphery of the element, said individual elements being adapted to be assembled with one another with a relative angular shift such that the first zone of one element registers with the second zone of the two adjacent elements disposed on either side thereof.

2. Filter elements according to claim 1, characterized in that their outer peripheral edges are provided with means permitting the assembling of the elements in suitably angularly shifted positions, said means consisting for example of diametrally opposite perforated lugs adapted to receive assembling tie-rods or bolts therethrough.

3. Filter systems consisting of a crankcase receiving therein a filter unit consisting of a stacking of a series of filter elements according to claim 1.

4. Filter elements according to claim 1, characterized in that said sealing bead separating the two zones of each element and defining the inner and outer edges of said zones consists of plastic material moulded on the filtering wall constituting the whole or part of each element.

5. Filter elements according to claim 4, characterized in that one of the two zones of each element consists of a solid wall adapted to be made of moulded plastic material, the same procedure also applying to the sealing bead separating the two zones of each filter element.

6. Filter elements according to claim 4, characterized in that the whole of the surface area of each element consists of a filtering wall, the two separate zones of each element being subdivided in turn into several sections.

References Cited

FOREIGN PATENTS 710,832   6/1954   Great Britain.

REUBEN FRIEDMAN, Primary Examiner

FRANK A. SPEAR, Assistant Examiner

U.S. Cl. X.R.

210—343, 492